United States Patent
Bent et al.

(10) Patent No.: US 10,430,233 B1
(45) Date of Patent: Oct. 1, 2019

(54) SCHEDULING COMPUTATIONAL TASKS AMONG MULTIPLE CLASSES OF STORAGE RESOURCES BASED ON JOB CLASSIFICATION

(71) Applicant: EMC Corporation, Hopkinton, MA (US)

(72) Inventors: John M. Bent, Los Alamos, NM (US); James M. Pedone, Jr., West Boylston, MA (US); Sorin Faibish, Newton, MA (US); Percy Tzelnic, Concord, MA (US); Sasan Teymouri, Saratoga, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/751,721

(22) Filed: Jun. 26, 2015

(51) Int. Cl.
  *G06F 9/48* (2006.01)
  *G06F 9/50* (2006.01)

(52) U.S. Cl.
  CPC .......... *G06F 9/4881* (2013.01); *G06F 9/5011* (2013.01)

(58) Field of Classification Search
  None
  See application file for complete search history.

(56) References Cited

U.S. PATENT DOCUMENTS

| 2008/0010370 | A1* | 1/2008 | Peake, Jr. | G06F 11/3485 709/223 |
| 2013/0151803 | A1* | 6/2013 | Tofano | G06F 3/0641 711/165 |
| 2015/0347451 | A1* | 12/2015 | Lee | G06F 17/30194 707/610 |
| 2016/0364263 | A1* | 12/2016 | Cao | G06F 9/4818 |

OTHER PUBLICATIONS

Intel, Optimizing Hadoop Deployments, Jan. 14, 2014.*
Debnath et al, FlashStore: High Throughput Persistent KeyValue Store, 2010.*
Uppal et al., Flashy Prefetching for High-Performance Flash Drives, 2013.*

(Continued)

*Primary Examiner* — Sisley N Kim
(74) *Attorney, Agent, or Firm* — Ryan, Mason & Lewis, LLP

(57) ABSTRACT

Techniques are provided for scheduling computational tasks among multiple classes of storage resources based on a job classification. A job to be executed is classified into one of a plurality of predefined job classes. Each predefined job class is associated with a corresponding one of a plurality of predefined storage classes. The job is then assigned based on the classification to one of the storage resources of the predefined storage class associated with the classified predefined job class. Exemplary predefined storage classes include a performance class, a capacity class, a key-value storage class, and a shingled disk drive class. Exemplary predefined job classes include a CPU Intensive job class, an IO Intensive job class and a Small IO job class. Data required for a job is optionally prefetched before the job is assigned to a storage device. Data objects to be evicted from a storage device are optionally selected based on an anticipated future access.

22 Claims, 5 Drawing Sheets

(56) References Cited

OTHER PUBLICATIONS

Sabne et al., "HeteroDoop: A MapReduce Programming System for Accelerator Clusters", HPDC '15, Portland, Oregon (Jun. 2015).
"The PBS Job Scheduler" http://www.arc.ox.ac.uk/content/pbs, downloaded on Jun. 23, 2015.
"The Slurm Job Scheduler", http://www.arc.ox.ac.uk/content/slurm-job-scheduler, downloaded on Jun. 23, 2015.
Tannenbaum et al., "Condor—A Distributed Job Scheduler", MIT Press, pp. 307-350 (2001).
Sabne et al., HeteroDoop: Automatically Exploiting CPUs and GPUs for Big Data MapReduce, Purdue University.

* cited by examiner

FIG. 2A

```
insert_job(job) {// runs when a user submits a job
    // Classify job type
    // put each job into one of three queues 125-1 through 125-3 based on classification
    switch (job.profile) {
        case CPU_INTENSIVE:
            enqueue(job,cpu_intensive); break;
        case SMALL_IO:
            enqueue(job,small_io); break;
        case IO_INTENSIVE:
            enqueue(job,io_intensive);
            if (job.is_reducer()) {
                // prefetch needed data from slow storage tier 140-2 into the fast storage tier 140-1
            }
            break;
        default:
            assert(0);
            break;
    }
}
TO FIG. 2B
```

*FIG. 2B*

```
FROM FIG. 2A
// choose a job to run
select_job(job) {
  for each data_node 130 in available data_nodes {
    switch data_node.profile {
      case CPU_INTENSIVE:
        if job = dequeue(cpu_intensive) {
          run_job(job,data_node);
        } else if job = dequeue(small_io) {
          run_job(job,data_node);
        } else if job = dequeue(io_intensive) {
          run_job(job,data_node);
        }
        break;
TO FIG. 2C
```

*FIG. 2C*

```
FROM FIG. 2B
case SMALL_IO:
    // same as CPU Intensive but dequeue in different order
    // 1. small_io 2. io_intensive 3. cpu_intensive
case IO_INTENSIVE:
    // same as CPU Intensive but dequeue in different order
    // 1. io_intensive 2. small_io 3. cpu_intensive
    default:
      assert(0);
      break;
    }
  }
}
```

FIG. 3

```
300 ~
// 310: Code for Data Nodes 130
// the job tracker 120 calls it when it knows that data is no longer needed because the job has exited
evict_2t(file, off, len) {
    file.consumed = true;
    file.age = MAX_AGE;
    free_space(file.length);
}

// 320: Code for Job Tracker 120
start_job(job) {
    foreach task in job.tasks {
        foreach file in task.files {
            // use the existing code to find which data node 130 on which to run the job
            datanode = find_job_location();
            // send a message to that data node 130 to call its predict function on this file with HIGH_CONFIDENCE
        }
    }
}

// 330: Code for Job Tracker 120
end_job(job) {
    foreach file in jobs.files {
        foreach data node 130 on which this job ran tasks {
            // send a message to the data node 130 to call its evict_t2 routine on this file
        }
    }
}
```

SCHEDULING COMPUTATIONAL TASKS AMONG MULTIPLE CLASSES OF STORAGE RESOURCES BASED ON JOB CLASSIFICATION

FIELD

The field relates generally to data storage and more particularly to techniques for scheduling jobs in a job scheduling system.

BACKGROUND

It is often difficult to balance the conflicting demands of storage capacity requirements and performance requirements (e.g., access times). Multi-tier storage environments, such as two-tier storage systems, typically provide a performance tier that employs memory based on performance considerations and a capacity tier that employs storage based on capacity considerations. In this manner, multi-tier storage systems balance between the relative costs of memory and other storage and their relative speeds. Such multi-tier storage environments typically allow particular levels of performance to be achieved at a significantly lower cost than would otherwise be possible.

It is often desirable to provide such multi-tier storage environments transparently to users and applications. In some circumstances, however, applications can obtain performance improvements when the multiple tiers are visible to applications.

MapReduce is a programming model for processing large data sets, such as distributed computing tasks on clusters of computers. During the map phase, a master node receives an input, divides the input into smaller sub-tasks, and distributes the smaller sub-tasks to worker nodes. During the reduce phase, the master node collects the answers to the sub-tasks and combines the answers to form an output (i.e., the answer to the initial problem).

A number of job schedulers exist that allocate computational tasks, e.g., batch jobs, in such job scheduling environments among available computing resources. A need exists for improved job schedulers that assign different classes of jobs or tasks to different classes of storage resources.

SUMMARY

Embodiments of the present invention provide improved techniques for scheduling computational tasks among multiple classes of storage resources based on a job classification. An exemplary method comprises the steps of obtaining at least one job to be executed; obtaining a classification of a plurality of storage resources into one of a plurality of predefined storage classes; classifying the job into one of a plurality of predefined job classes, wherein each of the plurality of predefined job classes is associated with a corresponding one of the plurality of predefined storage classes; and assigning the job based on the classification to one of the plurality of storage resources of the predefined storage class associated with the classified predefined job class.

In one exemplary embodiment, the plurality of predefined storage classes comprises a performance class that employs storage resources based on performance considerations, a capacity class that employs storage resources based on capacity considerations, a key-value storage class that employs a hardware accelerated key-value store, and a shingled disk drive class. In addition, an exemplary plurality of predefined job classes comprises a CPU Intensive job class, an IO Intensive job class and a Small IO job class.

According to one aspect of the invention, data required for a job assigned to the IO Intensive job class is prefetched before the job is assigned to a storage device of the corresponding predefined storage class. According to another aspect of the invention, one or more data objects to be evicted from one or more storage devices are selected based on an anticipated future access.

Advantageously, illustrative embodiments of the invention assign different classes of jobs to different classes of storage resources in a job scheduling system based on a job classification so that jobs execute using storage resources that are suitable for the tasks to be performed. Job scheduling operations in accordance with aspects of the present invention allow jobs to execute more efficiently and/or more reliably. These and other features and advantages of the present invention will become more readily apparent from the accompanying drawings and the following detailed description.

BRIEF DESCRIPTION OF THE DRAWINGS

FIGS. 2A through 2C, collectively, illustrate exemplary pseudo code incorporating job scheduling aspects of the invention for the job tracker of FIG. 1;

FIG. 3 illustrates exemplary pseudo code for the job tracker and data nodes of FIG. 1.

DETAILED DESCRIPTION

Figure 1:
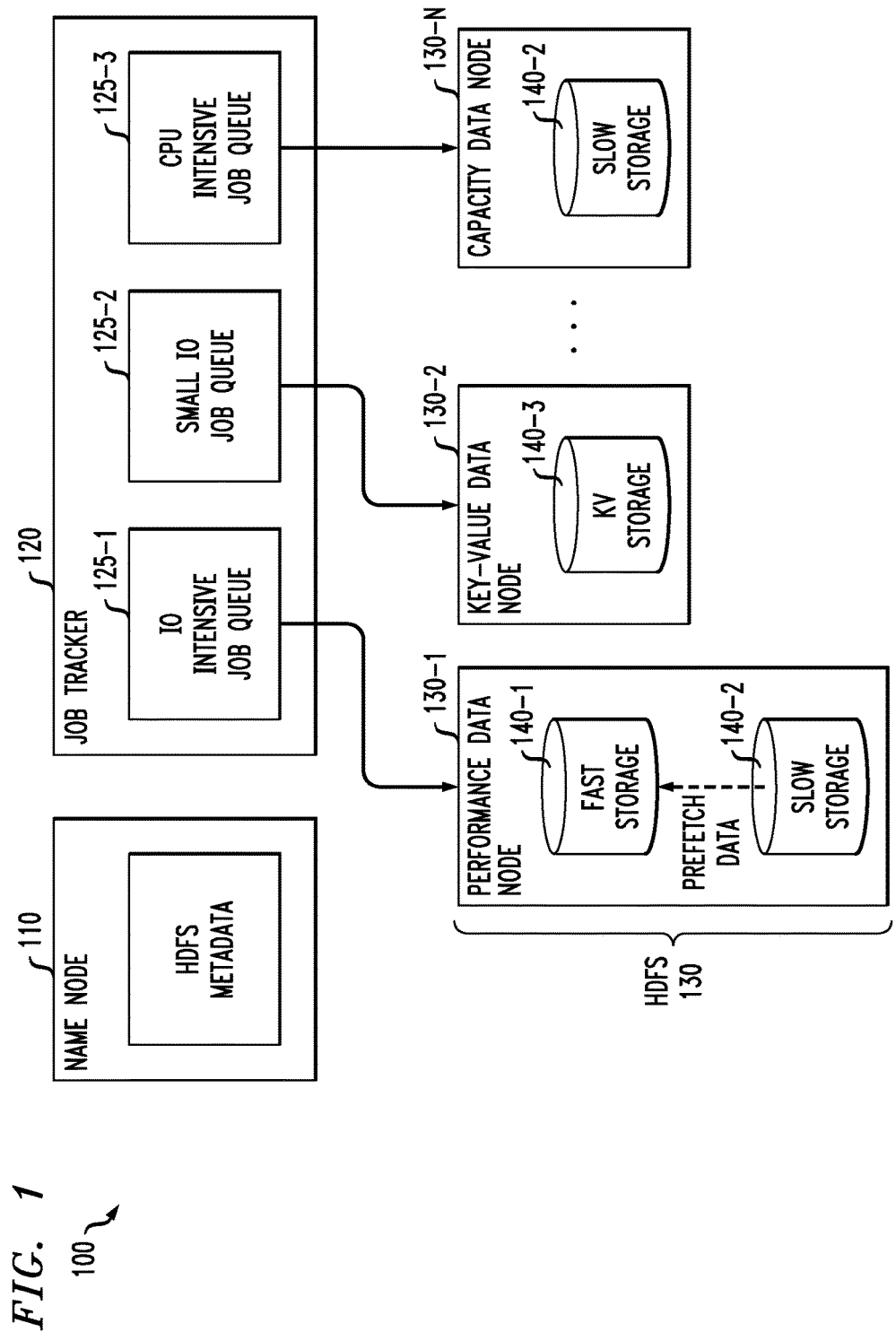
FIG. 1 illustrates an exemplary Hadoop architecture for distributed storage and distributed processing of large data sets.

Illustrative embodiments of the present invention will be described herein with reference to an exemplary MapReduce compute architecture and associated compute nodes, storage systems, applications and other processing devices. It is to be appreciated, however, that the invention is not restricted to use with the particular illustrative MapReduce architecture and device configurations shown. Accordingly, the terms "job scheduler" and "job tracker" as used herein are intended to be broadly construed, so as to encompass, for example, other job scheduling entities in a batch system, a distributed resource management system (DRMS), or a distributed resource manager (DRM), as would be apparent to a person of ordinary skill in the art.

According to one aspect of the invention, a job scheduler is provided that assigns different classes of jobs or tasks to appropriate differentiated storage resources based on a job classification. In one exemplary embodiment, multiple job classes and corresponding classes of storage resources are defined and the exemplary job scheduler assigns each job to an appropriate storage resource class based on a classification of each job into one of the predefined job classes.

For example, in one embodiment discussed further below, individual jobs can be classified as a CPU Intensive job; an IO Intensive job or a Small IO job. In addition, the corresponding classes of storage resources comprise a performance class that employs storage resources based on performance considerations, a capacity class that employs storage resources based on capacity considerations, and a key-value storage class that employs a hardware accelerated partitioned key-value store with reduced latency for producers and consumers of small data chunks.

In at least one exemplary embodiment, "small files" are distinguished from "large files" using a size threshold based on, for example, the page size of the file system and/or the client operating system. For example, a file system page size may be 4 Kbytes or 64 Kbytes, and any files smaller than the established page size may be characterized as small files.

Thus, aspects of the invention provide differentiated storage resources. For example, as discussed further below, storage resources may be generally differentiated between "fast" and "slow" storage layers. In addition, storage resources may be further differentiated between bandwidth optimized and IO operation (IOP) optimized storage layers. In another variation, the differentiated storage resources can include one or more of key-value flash-based DSSD™ storage system from EMC Corp., key-value disk-based Kinetic™ Open Storage platform from Seagate Technology LLC and shingled disk drives.

Another aspect of the present invention recognizes that data needed for a given IO Intensive job may be resident in a slow storage tier. Thus, required data for a given IO Intensive job is optionally prefetched from the slow storage tier to a fast storage tier before the given IO Intensive job is assigned to a data node for execution.

A further aspect of the invention performs future-aware victim selection for the multi-tiered storage to reduce the amount data stored in a fast storage tier that will not be needed in the near future. While conventional eviction algorithms typically guess about future data accesses, the disclosed techniques allow the job tracker to parse the job queue to determine future data accesses. In this manner, future-aware data eviction decisions are made to thereby minimize the amount of capacity in the fast storage tier that stores cold data (i.e., data that is not expected to be accessed).

FIG. 1 illustrates an exemplary Hadoop architecture 100 for distributed storage and distributed processing of large data sets on one or more computer clusters. As shown in FIG. 1, the exemplary Hadoop architecture 100 comprises a name node 110, a job tracker 120 and a Hadoop Distributed File System (HDFS) 130 comprised of a plurality of data nodes 130-1 through 130-N. Generally, an exemplary Hadoop architecture 100 splits input files into blocks and distributes the blocks among the plurality of data nodes 130. For a more detailed discussion of conventional aspects of the exemplary Hadoop architecture 100, see, for example, Ovum IT Information Management, "Enterprise-Grade Hadoop: The Building Blocks," (Sep. 24, 2014).

The exemplary name node 110 maintains the directory tree of all files in the file system, in a known manner, and tracks where file data is kept across the plurality of data nodes 130. Client applications communicate with the name node 110, for example, when they need to locate a file, or when they want to add, copy, move or delete a file, in a known manner. The name node 110 responds to file requests by returning a list of relevant data nodes 130 where the data is located.

In one exemplary embodiment, the name node 110 provides a single namespace for a multi-tiered architecture combining small, fast storage layers (such as flash storage) with larger, slower storage layers (such as disk-based, cloud-scale object stores). Among other benefits, the single namespace allows unmodified applications to run anywhere without any required knowledge about data locality.

In addition, the exemplary name node 110 provides one or more interfaces to allow data locality (i.e., where the data is stored in the HDFS 130) to be queried and controlled.

Client applications submit jobs to the job tracker 120. The exemplary job tracker 120 then assigns the jobs to specific data nodes 130. As noted above, according to one aspect of the invention, the exemplary job tracker 120 classifies each job to a predefined job class and assigns jobs of each job class to a data node 130 associated with a corresponding storage class based on the job classification.

The exemplary job tracker 120 optionally maintains a separate job queue 125 for each predefined job class. As noted above, in at least one exemplary embodiment, individual jobs can be classified as a CPU Intensive job; an IO Intensive job or a Small IO job. Thus, in the exemplary embodiment of FIG. 1, the exemplary job tracker 120 maintains an IO Intensive job queue 125-1, a Small IO job queue 125-2 and a CPU Intensive job queue 125-3 for jobs of the corresponding class. In one exemplary embodiment, the various job class-specific queues 125-1 through 125-3 are implemented, for example, as first in-first out (FIFO) buffers. In a further variation, jobs can be assigned from a given queue 125, for example, based on a weight assigned to each job. It is noted, however, that the job tracker 120 can assign classified jobs to data nodes 130 from a single queue, as would be apparent to a person of ordinary skill in the art.

The classification of a given job to a predefined job class may be performed, for example, in accordance with the teachings of A. Sabne et al., "HeteroDoop: A MapReduce Programming System for Accelerator Clusters," Proc. of the 24th Int'l Symposium on High-Performance Parallel and Distributed Computing (HPDC '15), 235-46 (2015), incorporated by reference herein. In this manner, a conventional job tracker 120 is modified to classify a given job to a predefined job class based on specific job characteristics (e.g., whether a given job is CPU intensive or IO intensive).

Generally, the exemplary job tracker 120 communicates with the name node 110 to determine the location of data, in a known manner. In addition, the exemplary job tracker 120 assigns each job having an assigned predefined job class to a particular data node 130 associated with a corresponding predefined storage class, in accordance with aspects of the present invention. When the work is complete, the job tracker 120 optionally updates status information.

As noted above, the exemplary job tracker 120 assigns jobs of each job class to a data node 130 associated with a corresponding storage class. In the exemplary embodiment of FIG. 1, the HDFS 130 comprises one or more performance data nodes 130-1, one or more key-value data nodes 130-2, and one or more capacity data nodes 130-N. As shown in FIG. 1, the exemplary performance data node 130-1 comprises a fast storage tier 140-1 and a slow storage tier 140-2, discussed further below. In addition, the exemplary key-value data node 130-2 comprises a key-value (KV) storage 140-3, discussed further below. Finally, the exemplary capacity data node 130-N comprises a slow storage tier 140-2 that may be embodied in a similar manner as the slow storage tier 140-2 of the exemplary performance data node 130-1.

If a given implementation does not have separate performance data nodes 130-1 and key-value data nodes 130-2, then the corresponding IO Intensive job queue 125-1 and Small IO job queue 125-2 would collapse into a single queue 125, as would be apparent to a person of ordinary skill in the art.

Generally, as noted above, the data nodes 130-$i$ store data in the HDFS 130. On startup, a data node 130-$i$ typically connects to the name node 110 and then responds to requests from the name node 110 for file system operations. Client applications can talk directly to a data node 130-i, once the name node 110 has provided the location of the data. Similarly, MapReduce operations farmed out, for example, to task tracker instances near a particular data node 130-i, talk directly to the data node 130-i to access the files. Task tracker instances can be deployed on the same servers as host data node 130-i instances, so that MapReduce operations are performed close to the data. Thus, each data node 130-i includes one or more processing units, such as one or more central processing units (CPUs) and/or one or more graphics processing units (GPUs).

IO Intensive Jobs and Corresponding Performance Data Node(s)

For jobs in the exemplary IO Intensive job class, jobs are assigned from the IO Intensive job queue 125-1 to the corresponding performance data node 130-1. One aspect of the present invention recognizes that data needed for a given IO Intensive job may be resident in the slow storage tier 140-2 of the performance data node 130-1. Thus, required data for a given IO Intensive job is optionally prefetched from the slow storage tier 140-2 to the fast storage tier 140-1 before the given IO Intensive job is assigned to the performance data node 130-1. In one exemplary embodiment, the given IO Intensive job is optionally maintained in the IO Intensive job queue 125-1 until the prefetch is complete. The given IO Intensive job can be assigned to the performance data node 130-1 for execution when the prefetch is complete. In this manner, the given IO Intensive job is delayed until the needed data is available. In this manner, the job tracker 120 prepares the Hadoop environment 100 before scheduling an IO intensive job by looking into the IO intensive job queue 125-1 and finding IO intensive jobs that need data that is not currently in the fast storage tier 140-1. The job tracker 120 then sends directives to the performance data node 130-1 to replicate the target data into the fast storage tier 140-1. In one exemplary embodiment, the job tracker 120 holds the job until the replication is complete.

For a more detailed discussion of suitable prefetching techniques, see, for example, U.S. patent application Ser. No. 14/751,740, entitled "Content-Aware Storage Tiering Techniques Within a Job Scheduling System," (now U.S. Pat. No. 9,934,147) filed contemporaneously herewith and incorporated by reference herein.

As indicated above, the exemplary performance data node 130-1 of FIG. 1 comprises a fast storage tier 140-1 and a slow storage tier 140-2. It is to be appreciated, however, that more than two storage tiers may be used in the exemplary performance data node 130-1 in other embodiments. The exemplary fast storage tier 140-1 and slow storage tier 140-2 comprise respective disjoint subsets of storage. The fast storage tier 140-1 and slow storage tier 140-2 in this embodiment comprise different types of storage devices having different performance characteristics. In the present embodiment, the exemplary fast storage tier 140-1 comprises flash storage devices and the exemplary and slow storage tier 140-2 comprises one or more disk storage devices.

The flash storage devices of the fast storage tier 140-1 are generally significantly faster in terms of read and write access times than the disk storage devices of the slow storage tier 140-2. The flash storage devices are therefore considered "fast" devices in this embodiment relative to the "slow" disk storage devices. Accordingly, the exemplary Hadoop architecture 100 may be characterized in the present embodiment as having a "fast" storage tier 140-1 and a "slow" storage tier 140-2, where "fast" and "slow" in this context are relative terms and not intended to denote any particular absolute performance level. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices of the fast storage tier 140-1 generally provide higher performance than the disk storage devices of the slow storage tier 140-2, but the disk storage devices of the slow storage tier 140-2 generally provide higher capacity at lower cost than the flash storage devices. The exemplary tiering arrangement of the performance data node 130-1 in FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the Hadoop architecture 100, leading to enhanced system performance relative to conventional arrangements, while additionally or alternatively providing an ability to achieve particular levels of performance at lower cost.

In a further variation, additional performance improvements can be achieved when applications are modified to employ the multi-tiered storage and job scheduling techniques described herein. While the job tracker 120 has some knowledge about data dependencies, the applications themselves have even more information available regarding data dependencies. Typically, in the exemplary Hadoop environment 100, a chunk of a shared file is typically split into HDFS "FileSplits." For example, a shared file is often split into a plurality of chunks, often referred to as File Splits, stored on a number of different data nodes. Different jobs will each consume a different chunk of a shared file. Some File Splits might be read multiple times or only once. This information is typically only available to the applications themselves. Therefore, modified applications inform the job tracker 120 or data nodes 130 of future accesses so that the victim selection can be more reliable.

Small IO Jobs and Corresponding Key-Value Data Node(s)

As noted above, one aspect of the invention differentiates between IO intensive jobs that are bandwidth bound (i.e., perform sequential IO operations) and IO intensive jobs that are IOPs bound (i.e., do small IOs). For Small IO jobs, scheduling throughput is optionally further improved by using heterogeneous storage devices that have different performance characteristics.

Additionally, as discussed below, the exemplary job tracker 120 considers the eventual placement of the Reduce tasks that follow the Map tasks. For jobs that do many small IOs, the job tracker 120 will take advantage of shared devices such as hardware accelerated key-value stores that are optimized for the storage of key-value data. For example, the key-value flash-based DSSD™ storage system from EMC Corp. provides shared flash storage across a PCI Express (Peripheral Component Interconnect Express) switch to multiple compute systems. The exemplary multi-tier storage system abstracts DSSD™ storage and stores small data chunks efficiently using the DSSD™ key-value Application Programming Interface (API) for reduced latency for producers and consumers of small data chunks, as discussed below.

As noted above, the key-value data node 130-2 comprises a key-value storage 140-3. The key-value storage 140-3 can be implemented, for example, using a hardware accelerated key-value store that is optimized for the storage of key-value data. For a more detailed discussion of suitable hardware accelerated key-value stores, see, for example, U.S. patent application Ser. No. 14/318,913, filed Jun. 30, 2014, entitled, "Parallel Storage System with Multi-Tier Hardware Accelerated Partitioned Key-Value Storage," incorporated by reference herein.

In the exemplary MapReduce setting, a small IO mapper (also known as a producer) executes on the key-value data node 130-2. Key-Value IO is intercepted and rerouted to the key-value interface of the key-value storage 140-3. Then, a small IO reducer (also known as a consumer) executes and the reads are intercepted and rerouted to the key-value interface of the key-value storage 140-3 in a similar manner the producer IO.

CPU Intensive Jobs and Corresponding Capacity Data Node(s)

As noted above, the exemplary capacity data node 130-N comprises a slow storage tier 140-2 that may be embodied in a similar manner as the slow storage tier 140-2 of the exemplary performance data node 130-1. Jobs may be assigned to the capacity data nodes 130-N directly from the CPU Intensive job queue 125-3 to the capacity data node 130-N.

In one variation, the capacity data node 130-N optionally provides different classes of storage for CPU intensive jobs since even CPU intensive jobs do some IO and will benefit from better IO performance. For example, CPU intensive jobs that do sequential IO are optionally mapped to shingled hard drives, when possible. In addition, CPU intensive jobs that do random IO are optionally mapped to disk drives with better IOPs performance such as the key-value disk-based Kinetic™ Open Storage platform from Seagate Technology LLC.

Pseudo Code

FIGS. 2A through 2C, collectively, illustrate exemplary pseudo code 200 for the job tracker 120 of FIG. 1 incorporating aspects of the invention. As shown in FIG. 2A, the exemplary pseudo code 200 initially classifies the job type of a submitted job into one of the three exemplary classes: CPU Intensive job, Small IO job, or IO Intensive job. Once the job is classified, the job is placed in a corresponding queue: CPU Intensive job queue 125-3, IO Intensive job queue 125-1, or a Small IO job queue 125-2. As further shown in FIG. 2A, if the job is an IO Intensive job, prefetching is performed, if needed, from the slow storage tier 140-2 into the fast storage tier 140-1, in the manner described above.

As shown in FIG. 2B, the job tracker 120 then selects a job to run from one of the queues 125. The handling of CPU Intensive jobs by the job tracker 120 is also shown in FIG. 2B. FIG. 2C illustrates the handling of Small IO jobs and IO Intensive jobs by the job tracker 120, in a similar manner as the handling of CPU Intensive jobs.

FIG. 3 illustrates exemplary pseudo code 300 for the job tracker 120 and data nodes 130 of FIG. 1. As shown in FIG. 3, the exemplary pseudo code 300 comprises a code section 310 that is performed by one or more data nodes 130 to evict data. Code section 310 is triggered when the job tracker 120 knows that data is no longer needed because the job has exited.

In addition, the exemplary pseudo code 300 comprises a code section 320 that is performed by the job tracker 120 to select a data node 130 to run a particular job. In addition, the job tracker 120 notifies the selected data node 130 to call a predict function to obtain the data with high confidence.

The exemplary pseudo code 300 also comprises a code section 330 that is performed by the job tracker 120 to trigger the eviction of data that is no longer needed because the job has exited.

EXAMPLES

Assume that an institution has a mix of IO and CPU intensive jobs submitted to a Hadoop job tracker 120. The institution further has a two-tier storage architecture of which the job tracker 120 is aware. The job tracker 120 looks at the data requirements of the jobs in the queue and immediately schedules CPU intensive jobs using one or more capacity data nodes 130-N. For IO intensive jobs, the job tracker 120 queries the two-tier interface to discover which of the required data sets is already resident in the performance storage tier 140. The job tracker 120 then schedules the jobs needing those data sets in the performance storage tier 140 to run using the performance storage tier 140. For jobs needing data that is not yet resident in the performance storage tier 140, the job tracker 120 initiates prefetch requests to the two-tier interface. Of course, the job tracker 120 will need to ensure that it avoids thrashing using existing well-known algorithms. When the MapReduce mappers are done with the input data sets and when the MapReduce reducers are done with the mapper outputs, the job tracker 120 will request that the two-tier system free those data sets from the fast tier.

In another example, an institution has a similar workload as in the prior example, but has further job differentiation in that some of the IO intensive jobs are more latency bound and some are more bandwidth bound. Additionally, there are different ratios of mappers to reducers for different jobs. The two-tier architecture has a mix of physical storage devices in the fast-tier: such as one or more DSSD™ devices and one or more conventional flash storage devices. The job tracker 120 will place IO intensive jobs that have large ratios of mappers to reducers on the exemplary DSSD™ system so that the producer-consumer relationship between mappers and reducers can best take advantage of the lower-latency PCI Express shared DSSD™ storage, as described above. Jobs with smaller ratios of mappers to reducers can be placed on a conventional flash storage device where the shared access across large numbers of separate processes is not as important.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

As noted above, aspects of the invention are described in the context of an exemplary MapReduce compute architecture, the invention is not restricted to use with the particular illustrative MapReduce architecture and device configurations shown. The invention is applicable to other job scheduling systems, such as the Condor distributed job scheduler, the Slurm job scheduler or the Portable Batch System (PBS) job scheduler, as would be apparent to a person of ordinary skill in the art.

It is to be appreciated that the particular operations and associated messaging illustrated in FIGS. 2A-2C and 3 are exemplary only, and numerous other types of operations and messaging may be used in other embodiments. It should therefore be understood that in other embodiments different arrangements of additional or alternative elements may be used. At least a subset of these elements may be collectively implemented on a common processing platform, or each such element may be implemented on a separate processing platform.

It is noted that components of the name node 110, the job tracker 120 or a data node 130 as disclosed herein can be implemented at least in part in the form of one or more software programs stored in memory and executed by a processor of a processing device. A memory having such program code embodied therein is an example of what is more generally referred to herein as a "computer program product."

Figure 4:
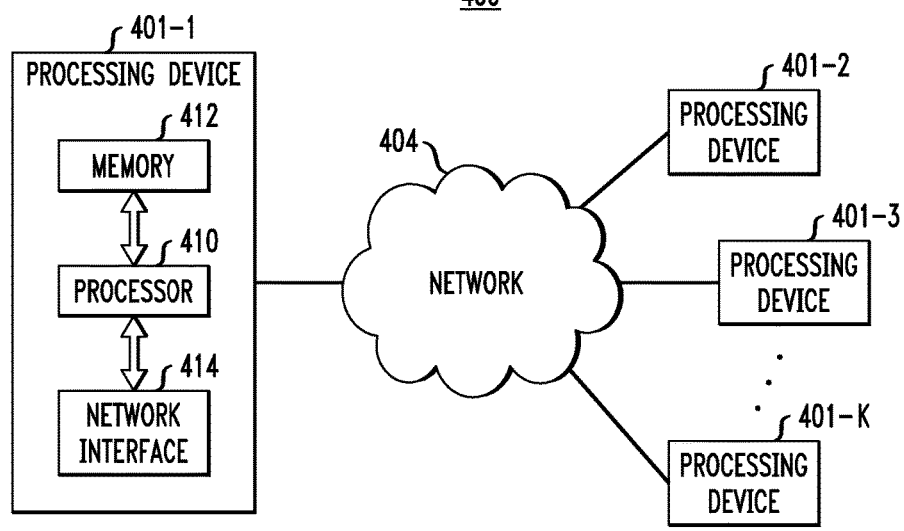
FIG. 4 illustrates an exemplary processing platform in which aspects of the present invention can be employed.

FIG. 4 illustrates an exemplary processing platform in which aspects of the present invention can be employed. The exemplary processing platform 400 comprises a plurality of processing devices, denoted 401-1, 401-2, 401-3, . . . 401-K, that communicate with one another over a network 404. The network 404 may comprise any type of network, such as a WAN, a LAN, a satellite network, a telephone or cable network, or various portions or combinations of these and other types of networks.

The processing device 401-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 401-1 is network interface circuitry 414, which is used to interface the processing device with the network 404 and other system components, and may comprise conventional transceivers.

The other processing devices 401 of the processing platform 400 are assumed to be configured in a manner similar to that shown for processing device 401-1 in the figure.

Again, the particular processing platform 400 shown in FIG. 4 is presented by way of example only, and Hadoop architecture 100, 200 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the job scheduling techniques disclosed herein. Also, the particular configuration of system and device elements shown in FIGS. 1 and 4 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A job scheduling method comprising:
    obtaining at least one job to be executed from a client application;
    obtaining a classification of a plurality of storage resources in a plurality of storage tiers into one of a plurality of predefined storage classes, wherein said plurality of predefined storage classes comprises at least two of a CPU Intensive storage class; an IO Intensive storage class and a Small IO storage class for said plurality of storage resources in said plurality of storage tiers;
    maintaining a plurality of job queues comprising at least two of a CPU Intensive job queue; an IO Intensive job queue and a Small IO job queue;
    classifying, in response to said obtaining said at least one job to be executed from said client application, said at least one job to be executed into a particular one of a plurality of predefined job classes based on one or more characteristics of the at least one job to be executed, wherein said plurality of predefined job classes comprises at least two of a CPU Intensive job class; an Intensive job class and a Small IO job class, wherein each of said plurality of predefined job classes is associated with a corresponding one of said plurality of predefined storage classes; and
    dynamically assigning, in response to said obtaining said at least one job to be executed from said client application, said at least one job to be executed to one of the plurality of job queues for the predefined storage class associated with the particular predefined job class, wherein the storage resource for the predefined storage class is in at least one of the plurality of storage tiers, wherein the step of dynamically assigning said at least one job to be executed to the at least one storage class is based on said classifying of the at least one job to be executed into the particular predefined job class.

2. The method of claim 1 wherein said plurality of predefined storage classes comprises at least two of a performance class that employs storage resources based on performance considerations, a capacity class that employs storage resources based on capacity considerations, a key-value storage class that employs a hardware accelerated key-value store, and a shingled disk drive class.

3. The method of claim 2 wherein said key-value storage class comprises one or more of a key-value flash-based storage system and a key-value disk-based storage system.

4. The method of claim 1 wherein at least one job is assigned to said Small IO job class based on a comparison of one or more data objects associated with said at least one job to a page size threshold.

5. The method of claim 1 further comprising the step of prefetching data required for at least one job assigned to said IO Intensive job class before said at least one job is assigned to a storage device of said corresponding predefined storage class.

6. The method of claim 1 further comprising the step of selecting one or more data objects to be evicted from one or more storage devices based on an anticipated future access.

7. A computer program product comprising a non-transitory processor-readable storage medium having encoded therein executable code of one or more software programs, wherein the one or more software programs when executed perform the steps of the method of claim 1.

8. The method of claim 1 further comprising the steps of querying a multi-tier interface to identify required data sets already resident in a performance storage tier and scheduling one or more jobs requiring said required data sets in a performance storage tier to execute using said performance storage tier.

9. The method of claim 1 further comprising the step of parsing said plurality of job queues to organize data for said classified jobs based on future data accesses.

10. A system, comprising:
a memory; and
at least one processing device, coupled to the memory, operative to implement the following steps:
obtaining at least one job to be executed from a client application;
obtaining a classification of a plurality of storage resources in a plurality of storage tiers into one of a plurality of predefined storage classes, wherein said plurality of predefined storage classes comprises at least two of a CPU Intensive storage class; an IO Intensive storage class and a Small IO storage class for said plurality of storage resources in said plurality of storage tiers;
maintaining a plurality of job queues comprising at least two of a CPU Intensive job queue; an IO Intensive job queue and a Small IO job queue;
classifying, in response to said obtaining said at least one job to be executed from said client application, said at least one job to be executed into a particular one of a plurality of predefined job classes based on one or more characteristics of the at least one job to be executed, wherein said plurality of predefined job classes comprises at least two of a CPU Intensive job class; an Intensive job class and a Small IO job class, wherein each of said plurality of predefined job classes is associated with a corresponding one of said plurality of predefined storage classes; and
dynamically assigning, in response to said obtaining said at least one job to be executed from said client application, said at least one job to be executed to one of the plurality of job queues for the predefined storage class associated with the particular predefined job class, wherein the storage resource for the predefined storage class is in at least one of the plurality of storage tiers, wherein the step of dynamically assigning said at least one job to be executed to the at least one storage class is based on said classifying of the at least one job to be executed into the particular predefined job class.

11. The system of claim 10 wherein said plurality of predefined storage classes comprises at least two of a performance class that employs storage resources based on performance considerations, a capacity class that employs storage resources based on capacity considerations, a key-value storage class that employs a hardware accelerated key-value store, and a shingled disk drive class.

12. The system of claim 10 wherein at least one job is assigned to said Small IO job class based on a comparison of one or more data objects associated with said at least one job to a page size threshold.

13. The system of claim 10 wherein said at least one processing device is further configured to prefetch data required for at least one job assigned to said IO Intensive job class before said at least one job is assigned to a storage device of said corresponding predefined storage class.

14. The system of claim 10 wherein said at least one processing device is further configured to select one or more data objects to be evicted from one or more storage devices based on an anticipated future access.

15. The system of claim 10 wherein said at least one process device is further configured to query a multi-tier interface to identify required data sets already resident in a performance storage tier and schedule one or more jobs requiring said required data sets in a performance storage tier to execute using said performance storage tier.

16. The system of claim 10 further comprising the step of parsing said plurality of job queues to organize data for said classified jobs based on future data accesses.

17. A job scheduling system comprising:
a plurality of data nodes; and
a job scheduling node, wherein the job scheduling node is configured to:
communicate with said plurality of said data nodes over a network;
obtain at least one job to be executed from a client application;
obtain a classification of a plurality of storage resources in a plurality of storage tiers into one of a plurality of predefined storage classes, wherein said plurality of predefined storage classes comprises at least two of a CPU Intensive storage class; an IO Intensive storage class and a Small IO storage class for said plurality of storage resources in said plurality of storage tiers;
maintain a plurality of job queues comprising at least two of a CPU Intensive job queue; an IO Intensive job queue and a Small IO job queue;
classify, in response to said obtaining said at least one job to be executed from said client application, said at least one job to be executed into a particular one of a plurality of predefined job classes based on one or more characteristics of the at least one job to be executed, wherein said plurality of predefined job classes comprises at least two of a CPU Intensive job class; an Intensive job class and a Small IO job class, wherein each of said plurality of predefined job classes is associated with a corresponding one of said plurality of predefined storage classes; and
dynamically assign, in response to said obtaining said at least one job to be executed from said client application, said at least one job to be executed to one of the plurality of job queues for the predefined storage class associated with the particular predefined job class, wherein the storage resource for the predefined storage class is in at least one of the plurality of storage tiers, wherein the step of dynamically assigning said at least one job to be executed to the at least one storage class is based on said classifying of the at least one job to be executed into the particular predefined job class.

18. The job scheduling system of claim 17 wherein said plurality of predefined storage classes comprises at least two of a performance class that employs storage resources based on performance considerations, a capacity class that employs storage resources based on capacity considerations, a key-value storage class that employs a hardware accelerated key-value store, and a shingled disk drive class.

19. The job scheduling system of claim 17 wherein at least one job is assigned to said Small IO job class based on a comparison of one or more data objects associated with said at least one job to a page size threshold.

20. The job scheduling system of claim 17 wherein said at least one processing device is further configured to prefetch data required for at least one job assigned to said IO Intensive job class before said at least one job is assigned to a storage device of said corresponding predefined storage class.

21. The job scheduling system of claim 17 wherein said at least one processing device is further configured to select one or more data objects to be evicted from one or more storage devices based on an anticipated future access.

22. The job scheduling system of claim 17 wherein said at least one process device is further configured to query a multi-tier interface to identify required data sets already resident in a performance storage tier and schedule one or more jobs requiring said required data sets in a performance storage tier to execute using said performance storage tier.

* * * * *